US012589651B1

(12) United States Patent      (10) Patent No.: US 12,589,651 B1

Heaser et al.      (45) Date of Patent: Mar. 31, 2026

(54) SOBRIETY CHECK LOCKING KEY CASE

(71) Applicants: Kyle Heaser, Lino Lakes, MN (US); Aspen Vetter, Glenwood Springs, CO (US)

(72) Inventors: Kyle Heaser, Lino Lakes, MN (US); Aspen Vetter, Glenwood Springs, CO (US)

(*) Notice: Subject to any disclaimer, the term of this patent is extended or adjusted under 35 U.S.C. 154(b) by 0 days.

(21) Appl. No.: 18/763,235

(22) Filed: Jul. 3, 2024

Related U.S. Application Data

(60) Provisional application No. 63/512,222, filed on Jul. 6, 2023.

(51) Int. Cl.
     B60K 28/06      (2006.01)
     E05B 19/00      (2006.01)

(52) U.S. Cl.
     CPC ........ B60K 28/063 (2013.01); E05B 19/0005 (2013.01)

(58) Field of Classification Search
     CPC ... B62K 28/063; E05B 19/0005; A61B 5/097; G01N 33/98
     See application file for complete search history.

(56) References Cited

U.S. PATENT DOCUMENTS

| | | | | |
|---|---|---|---|---|
| 5,111,755 | A * | 5/1992 | Rouse | .................. E05G 1/00 |
| | | | | 109/47 |
| 6,418,766 | B1 * | 7/2002 | Luebeck | ........... E05B 19/0005 |
| | | | | 70/371 |
| 7,299,890 | B2 | 11/2007 | Mobley et al. | |
| 7,413,047 | B2 | 8/2008 | Brown et al. | |
| 7,930,927 | B2 | 4/2011 | Cooper et al. | |
| 8,049,631 | B1 * | 11/2011 | Edwards | ............. B60K 28/063 |
| | | | | 340/576 |
| 8,095,193 | B2 | 1/2012 | Ridder et al. | |
| 8,657,744 | B2 | 2/2014 | Rompa et al. | |
| 9,241,659 | B2 | 1/2016 | Rompa, Jr. et al. | |
| 9,480,431 | B2 | 11/2016 | Melton | |
| 9,709,581 | B1 | 7/2017 | Gordon et al. | |
| 9,709,582 | B1 | 7/2017 | Gordon et al. | |
| 9,726,684 | B1 | 8/2017 | Gordon et al. | |
| 9,921,234 | B1 | 3/2018 | Lynn et al. | |
| 9,933,445 | B1 | 4/2018 | Lynn et al. | |

(Continued)

FOREIGN PATENT DOCUMENTS

| | | | | |
|---|---|---|---|---|
| DE | 102016202376 | A1 * | 10/2016 | ........... B60K 28/063 |
| GB | 2526561 | A * | 12/2015 | ............. B60R 25/00 |

(Continued)

OTHER PUBLICATIONS

Quix et al. DE 10 2016 202376 (Year: 2016).*

*Primary Examiner* — Karen Beck

(74) *Attorney, Agent, or Firm* — Sherrill Law Offices, PLLC; Michael Sherrill

(57) ABSTRACT

A vehicle operation sobriety control unit functional for preventing operation of a vehicle by an intoxicated individual. The unit includes a module and a key case, whereby a vehicle start key retained within the key case is available to start a vehicle only when the module detects and measures a blood intoxicant concentration level below a predefined threshold blood intoxicant concentration level. The sobriety control unit has a shape that imitates a commonplace object so as to conceal the functionality of the sobriety control unit.

9 Claims, 2 Drawing Sheets

(56)     References Cited

U.S. PATENT DOCUMENTS

| 9,945,878 | B1 | 4/2018 | Gordon et al. |
| 10,247,742 | B1 | 4/2019 | Lynn et al. |
| 10,408,850 | B1 | 9/2019 | Gordon et al. |
| 10,722,160 | B2 | 7/2020 | Wang et al. |
| 10,955,428 | B2 | 3/2021 | Lynn et al. |
| 11,187,711 | B1 | 11/2021 | Lynn et al. |
| 11,278,222 | B2 | 3/2022 | Moeller et al. |
| 11,324,449 | B2 | 5/2022 | Nothacker et al. |
| 11,602,306 | B2 | 3/2023 | Nothacker |
| 2004/0085211 | A1* | 5/2004 | Gotfried ............ G07C 9/00563 |
| | | | 340/576 |
| 2006/0028176 | A1* | 2/2006 | Tang ................... H02J 7/00047 |
| | | | 320/114 |
| 2011/0100074 | A1* | 5/2011 | Meekma ................ E05B 37/02 |
| | | | 70/63 |
| 2011/0154887 | A1 | 6/2011 | Cooper et al. |
| 2012/0078473 | A1 | 3/2012 | Ridder et al. |
| 2013/0168175 | A1* | 7/2013 | Polzius ............. A61B 10/0045 |
| | | | 180/272 |
| 2014/0365142 | A1 | 12/2014 | Baldwin |
| 2015/0244452 | A1* | 8/2015 | Grohman ............. B60K 28/063 |
| | | | 73/23.3 |
| 2015/0291029 | A1* | 10/2015 | Roth .................... B60K 28/063 |
| | | | 340/576 |
| 2016/0303967 | A1* | 10/2016 | Quix ................. B60W 50/0098 |
| 2017/0228954 | A1* | 8/2017 | Evans .................. G07C 9/0069 |
| 2018/0190056 | A1* | 7/2018 | Desinor, Jr. ........ G07C 9/00309 |
| 2018/0306776 | A1* | 10/2018 | Cado ................... G01N 33/4972 |
| 2020/0397368 | A1 | 12/2020 | Polzius et al. |
| 2021/0076988 | A1 | 3/2021 | Wang et al. |
| 2022/0287641 | A1 | 9/2022 | Nothacker et al. |
| 2023/0015605 | A1 | 1/2023 | Nothacker et al. |
| 2023/0028690 | A1 | 1/2023 | Woods et al. |
| 2023/0138641 | A1 | 5/2023 | Graham et al. |

FOREIGN PATENT DOCUMENTS

| GB | 2536422 A | * | 9/2016 | .......... B60K 28/063 |
| WO | WO-2010012158 A1 | * | 2/2010 | ............ G01N 33/98 |

* cited by examiner

SOBRIETY CHECK LOCKING KEY CASE

BACKGROUND

Blood Alcohol Concentration (BAC) refers to the percent of alcohol (ethyl alcohol or ethanol) in a person's blood stream.

In most states, the BAC limit for operation of a motorized vehicle is 0.08%. The BAC limit for operation of a commercial vehicle is 0.04%.

Breathalyzers for measuring BAC by blowing into the device are well known and widely used. They are used by law enforcement departments for on-site determination of a driver's sobriety, and are widely available for personal use as well.

Another, more recent technological advance for measuring BAC is a transdermal alcohol sensor. Briefly, transdermal alcohol sensors measure the alcohol concentration of sweat excreted through the skin. See, U.S. Pat. Nos. 7,299, 890B2, 7,413,047B2, 7930927B2, 8095193B2, 8657744B2, 9241659B2, 9480431B2, 10722160B2, 11278222B2, 11324449B2 and U.S. Pat. No. 11,602,306B2, and US Patent Application Publications 20110154887A1, 20120078473A1, 20140365142A1, 20150244452A1, 20200397368A1, 20210076988A1, 20220287641A1, 20230015605A1, 20230028690A1 and 20230138641A1, the disclosures of which are hereby incorporated by reference. Transdermal alcohol sensors are commercially available from a number of sources, including the Secure Continuous Remote Alcohol Monitor (SCRAM) produced by Alcohol Monitoring Systems (AMS) Inc., a subsidiary of LMG Holdings Incorporated of Alhambra, California.

Blood Cannabinoid Concentration (BCC) refers to the percent of cannabinoid, specifically tetrahydrocannabinol (THC) and more specifically 49 THC in a person's blood stream.

While BCC is notoriously unreliable for determining an individual's level of impairment, it is the only practical measurement available. Many states have established a BCC of less than 5 ng/ml for operation of a motorized vehicle.

With increased legalization of medicinal and recreational use of cannabinoids, particularly THC, it is becoming increasingly necessary to limit and control operation of a motorized vehicle by an individual having a BCC indicative of driving while impaired.

Breathalyzers for measuring Blood Cannabinoid Concentration (BCC) by blowing into the device are known and available. See, U.S. Pat. Nos. 9,709,581, 9,709,582, 9,726, 684, 9,921,234, 9,933,445, 9,945,878, 10,247,742, 10,408, 850, 10,955,428, and 11,187,711, the disclosures of which are hereby incorporated by reference.

Experience has shown, however, that even when individuals possess a personal breathalyzer or transdermal alcohol sensor for detecting BAC and/or BCC, they tend to not carry the breathalyzer or transdermal alcohol sensor with them due to its large size and the social stigma which often accompanies the possession and use of a breathalyzer or transdermal alcohol sensor. Furthermore, persons who are intoxicated tend to make poor choices and will typically forget or even consciously decide to bypass use of their personal breathalyzer or transdermal alcohol sensor before getting behind the wheel.

Hence, a substantial need exists for a small, personal, inconspicuous and accurate BAC and/or BCC device that must detect less than a preset BAC and/or BCC level in an individual before that individual can operate their motorized vehicle.

SUMMARY OF THE INVENTION

A vehicle operation sobriety control unit functional for preventing operation of a vehicle by an intoxicated individual. The unit includes a module and a key case. The module is operable for detecting and measuring a blood intoxicant concentration level of an individual and comparing a measured blood intoxicant concentration level relative to a threshold blood intoxicant concentration level. The key case is (i) selectively openable and closeable to provide and prevent access to a chamber respectively, (ii) operable for confining a vehicle start key within the closed chamber such that the confined vehicle start key is unable to start a vehicle, and (iii) default locked when closed to prevent access to the chamber when the key case is closed. The key case is in communication with the module for opening the key case when a blood intoxicant concentration level below the threshold blood intoxicant concentration level is detected by the module. The sobriety control unit has a shape that imitates a commonplace object so as to conceal the functionality of the sobriety control unit.

DETAILED DESCRIPTION OF A PREFERRED EMBODIMENT

Definitions

Figures 1, 2, 3, 4:
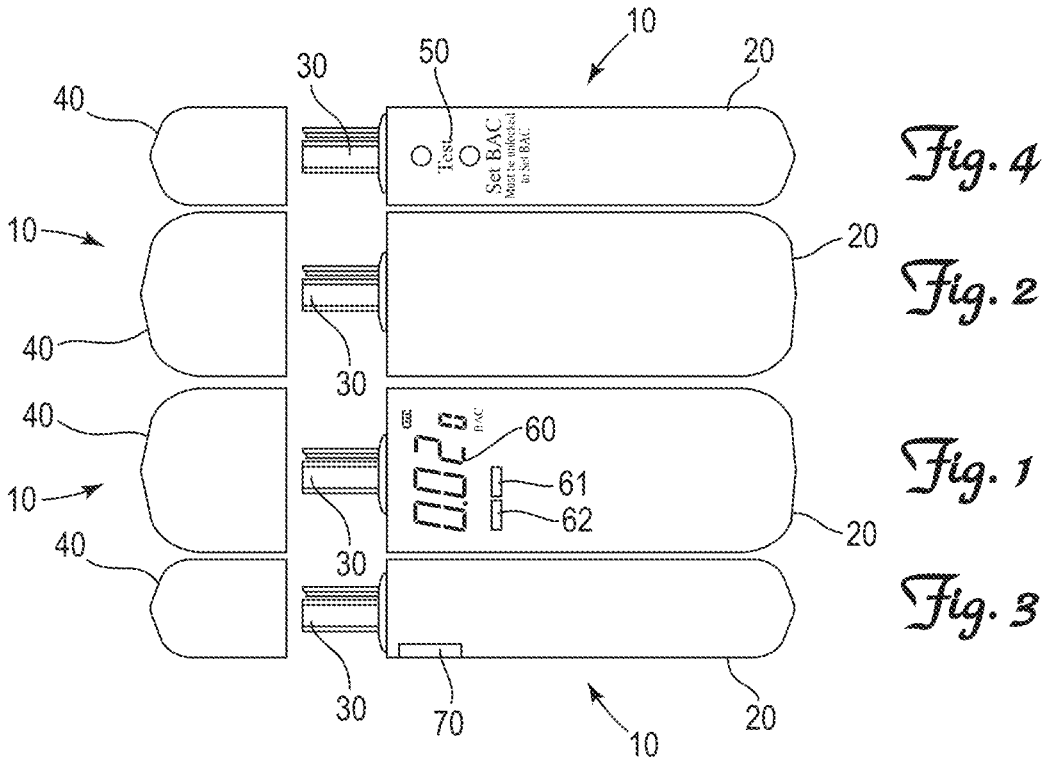
FIG. 1 is a front view of an integrated embodiment of the invention with cap detached.
FIG. 2 is a rear view of the invention depicted in FIG. 1.
FIG. 3 is a left side view of the invention depicted in FIG. 1.
FIG. 4 is a right side view of the invention depicted in FIG. 1.

As utilized herein, including the claims, the phrase "activation button" is used in an expansive sense to encompass any means by which the locking key case can be activated (turned on) and deactivated (turned off) including a push button, a rocker switch, a toggle switch, a slide switch, a rotary switch, a trigger switch, a touch switch, a sound activated switch, etc. Specifically, the activation button could be a slide switch effecting activation when the blow tube is extended and effecting deactivation when the blow tube is retracted.

As utilized herein, including the claims, the phrase "blood intoxicant concentration level" means the blood alcohol or blood cannabinoid concentration level, detected and measured by any suitable means including specifically but not exclusively a breathalyzer or transdermal analyzer.

| Nomenclature | |
| --- | --- |
| REFERENCE No. | NAME |
| 10 | Locking Key Case |
| 20 | Body |
| 30 | Blow Tube |
| 40 | Cap |
| 50 | Activation Button |
| 60 | LED Display |
| 61 | Green Light |

-continued

| Nomenclature | |
| --- | --- |
| REFERENCE No. | NAME |
| 62 | Red Light |
| 70 | Removable Door over Battery Chamber |
| 80 | Slide Tab |
| 110 | Locking Key Case |
| 115 | Transceiver on Key Case |
| 120 | Body of Locking Key Case |
| 130 | Breathalyzer |
| 131 | Blow Tube on Breathalyzer |
| 135 | Transceiver on Breathalyzer |
| 150 | Activation Button |
| 160 | LED Display |
| 201 | Charging Induction Coil |
| 202 | Chargeable Induction Coil |

Integrated Embodiment

Referring to FIGS. 1-4, the invention is a locking key case 10 that completely encases a vehicle key or proximity key fob (hereinafter collectively referenced as key) within a locked key retention chamber (not shown), and allows access to the key only when the locking key case 10 detects a BAC and/or BCC level less than a previously selected BAC and/or BCC threshold level.

The body 20 may be made of a material that can block the signals of a proximity functioning key fob, so if a proximity functioning key is locked in the locking key case 10 the fob will be unable to start the vehicle until the fob is removed. The body 20 can have an insert or lining of a suitable cushioning material (not shown) such as low durometer rubber, foam, etc.

The locking key case 10 can be shaped similar to a USB drive (but larger) or a traveling toothbrush container so as to make the locking key case 10 inconspicuous. Other discrete commonplace man-made objects, such as a case for reading glasses or a metallic wallet, or discrete naturally occurring object such as a stone or piece of driftwood, etc. may also be employed. A generally cylindrically shaped case approximately about 3 to 5 inches in length, about 1.75 to 2.5 inches in width and about 1 to 3 inches in height is most effective.

As a precaution against unauthorized access to a key in the locked locking key case 10 by a clever intoxicated user who is adamant about accessing the key in the locked locking key case 10, the locking key case 10 can be assembled such that nondestructive disassembly can only be achieved, with or without tools, when the locking key case 10 is open.

An LED display screen 60 is provided on the body 20 to display prompts and information.

If the key has a key ring, holes can be provided at the exposed edges of the opened body halves 20 for allowing the key ring to extend out from the key retention chamber (not shown) while still attached to the key. There is preferably a spring loaded plate (not shown) made of the same proximity signal blocking material as the body 20 that covers the key chain holes (not shown) when there is not a key chain in them, but will pivot or retract into the body 20 when a key chain is in the key chain holes (not shown).

When employing a breathalyzer, upon arrival at a destination where alcohol and/or THC is likely to be consumed or inhaled, the key to a vehicle driven to the destination can be inserted into the key retention chamber (unnumbered) defined by the body 20 by (i) pressing the activation button

50 on the side of the body 20, (ii) either removing the cap 40 or sliding the slide tab 80 to expose the blow tube 30, and then (iii) upon command from the LED display screen 60 (e.g., "BLOW") blowing into the exposed blow tube 30. If the measured BAC and/or BCC from the blow is less than a previously established BAC and/or BCC threshold level, a visual indicator will display underneath the LED display screen 60 (e.g., a green light 61 with or without the BAC and/or BCC detected level), and a latch (unnumbered) locking the body 20 will unlock. The body 20 can then automatically open or be manually opened (e.g., by pressing down on the latch (unnumbered)) to provide access to the key retention chamber (unnumbered) defined by the body 20. The key or key fob can then be placed inside the body 20 and the body 20 closed to once again lock the latch (unnumbered).

Access to a key locked in the key retention chamber (not shown) for use in operating the vehicle associated with the key requires the driver to again press the activation button 50 on the side of the body 20, remove the cap 40 or slide the slide tab 80 to expose the blow tube 30, and upon command from the LED display screen 60 (e.g., display BLOW), blow into the exposed blow tube 30.

When employing a transdermal alcohol sensor, upon arrival at a destination where alcohol is likely to be consumed, the key to a vehicle driven to the destination can be inserted into the key retention chamber (unnumbered) defined by the body 20 by (i) pressing the activation button 50 on the side of the body 20, and (ii) placing the sensor pad (not shown) on the transdermal alcohol sensor into contact with the skin until the LED display screen 60 indicates that a reading has been made. If the measured BAC is less than a previously established BAC threshold level, a visual indicator will display underneath the LED display screen 60 (e.g., a green light 61 with or without the BAC detected level), and a latch (unnumbered) locking the body 20 will unlock. The body 20 can then automatically open or be manually opened (e.g., by pressing down on the latch (unnumbered)) to provide access to the key retention chamber (unnumbered) defined by the body 20. The key or key fob can then be placed inside the body 20 and the body 20 closed to once again lock the latch (unnumbered).

Access to a key locked in the key retention chamber (not shown) for use in operating the vehicle associated with the key requires the driver to again press the activation button 50 on the side of the body 20, and place the sensor pad (not shown) into contact with the skin until the LED display screen 60 indicates that a reading has been made.

If the user's BAC and/or BCC is less than the previously selected BAC and/or BCC threshold level, the LED display screen 60 can then show a pass visual indicator (e.g., a green light 61) with or without the BAC and/or BCC detected level on the body 20, and the latch on the body 20 will release to provide access to and permit removal of the key retained therein. The numbers can blink, with the "%" and "BAC and/or BCC" stationary, not blinking. If, however, the user's BAC and/or BCC is greater than the preset BAC and/or BCC threshold level, then a fail visual indicator 62 (e.g., red light) can display underneath the LED display screen 60 with or without the BAC and/or BCC detected level and the latch (not shown) will remain locked, thereby preventing use of the key. In the event of a fail, an estimate of the time for the user's BAC and/or BCC level to fall below the threshold value, based upon the measured BAC and/or BCC level and typical rates of detoxification, can be calculated and displayed on the LED display screen 60.

The BAC and/or BCC threshold level can be set by pressing and holding the activation button 50, or perhaps by pressing a separate Set BAC and/or BCC button (not shown). The LED display screen 60 can display a first selectable BAC and/or BCC level with repeated pressing of the activation button 50 or Set BAC or BCC button (not shown) displaying progressively increasing BAC or BCC levels (e.g., 0.03% BAC, 0.04% BAC, 0.05 BAC, 0.06% BAC and finally 0.07% BAC and/or 2 ng/ml BCC, 3 ng/ml BCC, and finally 4 ng/ml BCC). It is preferred to limit the lowest selectable level at some amount over 0 to accommodate some level of sensor drift or detection of compounds other than alcohol or cannabinoid that could result in a prolonged mistaken lockout. It is also preferred to limit the highest selectable level at some amount less than the legal limit to prevent access to the key when the legal limit has been detected. Once the desired BAC and/or BCC threshold level is displayed, the level is selected as the BAC and/or BCC threshold level by pressing and holding the activation 50 or Set BAC/BCC button.

In a preferred embodiment, the BAC and/or BCC threshold level can be set or reset only while access to the locking key case 110 has been granted to eliminate the ability to access a locked key without "passing" the breathalyzer/transdermal alcohol sensor test by simply resetting the threshold level above the intended and desired level and above the level the user currently finds themselves. For example, the breathalyzer 130 can be programmed to automatically present an option to set or rest the BAC and/or BCC threshold level promptly after each "passed" breathalyzer test.

Optionally, the currently selected BAC and/or BCC threshold level can be checked at any time with a double click of the activation button 50 or Set BAC/BCC button.

The blow tube 30 on the breathalyzer embodiment can be located at the opposite end of the body 20 from the retention chamber (not shown). In one embodiment, a protective cap 40 covers the blow tube 30 to keep it clean and protect it from damage. The protective cap 40 can be secured to the body 20 with magnets (not shown) or via a friction or snap fit. In another embodiment, a slide tab 80 extends from the body 20 capable of thumb activated sliding of the blow tube 30 as between an extended use position and a retracted storage position concealed within the body 20.

The blow tube 30 on the breathalyzer embodiment is preferably replaceable, such as via a friction fit onto the body 20 which can be overcome by axially twisting the blow tube 30 relative to the body 20. The blow tube 30 can be translucent and sized for accurate breathalyzer tube size requirements.

The locking key case 10 can be powered by a disposable or rechargeable battery, such as a button cell battery (not shown) accessible through a slot on the side of the case 10 covered by a removable door 70. The door 70 can include a tray for receiving the battery that pops into place or out of place using spring tension. The locking key case 10 preferably has an automatic power down mode when not in use to save battery life.

Two-Part Embodiment

Figure 5:
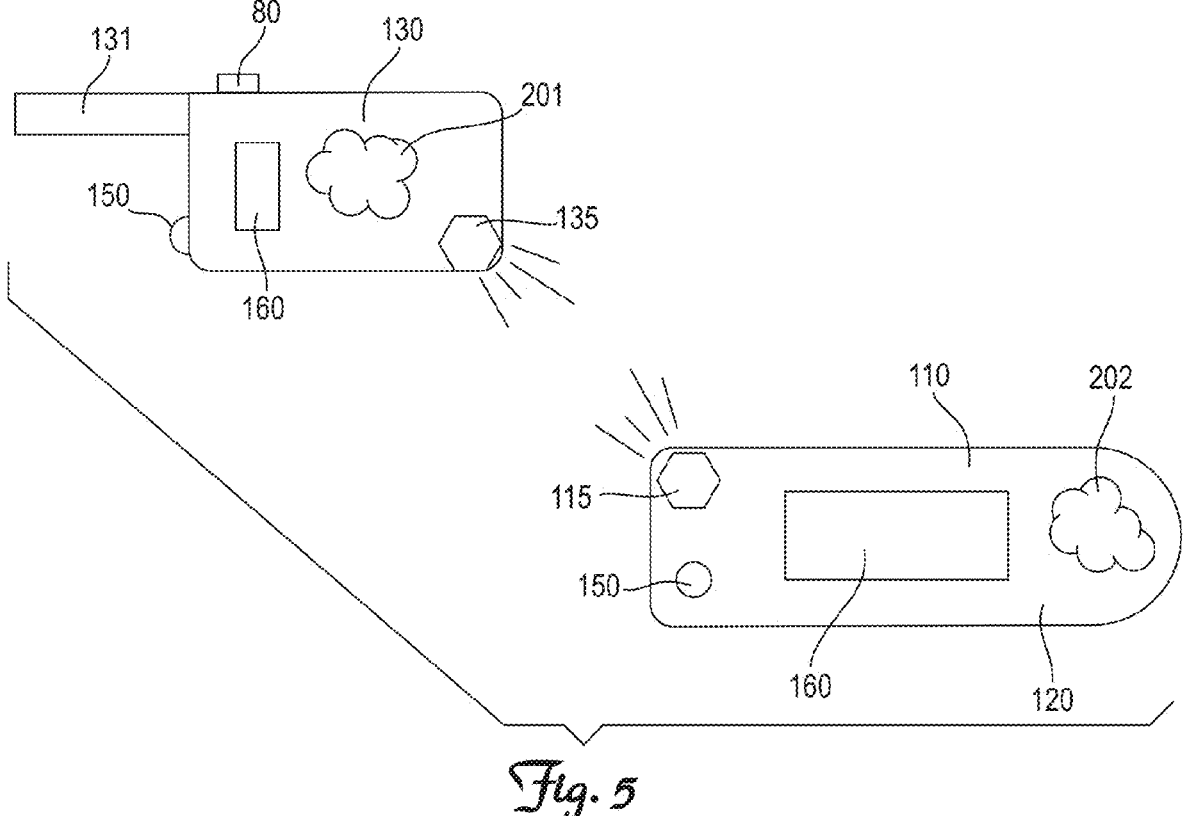
FIG. 5 is a schematic view of a two-part embodiment of the invention.

Referring to FIG. 5, the invention is a combination of a locking key case 110 equipped with a transceiver 115 and a breathalyzer 130/transdermal alcohol sensor equipped with a transceiver 135 whereby the locking key case 110 and the breathalyzer 130/transdermal alcohol sensor may communicate with one another by any suitable wireless means such as Bluetooth, Infrared communication, NFC, etc.

The locking key case 110 completely encases a vehicle key or proximity key fob (hereinafter collectively referenced as key) within a locked key retention chamber (not shown), and allows access to the key only when the locking key case 110 receives a signal from the breathalyzer 130/transdermal alcohol sensor that a BAC and/or BCC level less than a previously selected BAC and/or BCC threshold level has been detected.

At least the locked key retention chamber, and optionally the entire body 120 of the locking key case 110 can be lined with or made of a material effective for blocking the signals of a proximity functioning key fob, so if a proximity functioning key is locked in the locking key case 110 the fob will be unable to start the vehicle until the fob is removed. The locking key case 110 can further have an insert or lining of a suitable cushioning material (not shown) such as low durometer rubber, foam, etc.

The locking key case 110 can be shaped similar to a USB drive (but larger) or a traveling toothbrush container so as to make the locking key case 110 inconspicuous. Other shapes, such as a case for reading glasses, a metallic wallet, etc., may also be employed. A generally cylindrically shaped case approximately about 3 to 5 inches in length, about 1.75 to 2.5 inches in width and about 1 to 3 inches in height is most effective.

As a precaution against unauthorized access to a key in the locked locking key case 110 by a clever intoxicated user who is adamant about accessing the key in the locked locking key case 110, the locking key case 110 can be assembled such that nondestructive disassembly can only be achieved, with or without tools, when the locking key case 110 is open.

An LED display screen 160 can be provided on the body 120 of the locking key case 110 and/or the breathalyzer 130/transdermal alcohol sensor to display prompts and information.

If the key has a key ring, holes can be provided at the exposed edges of the opened body halves 120 for allowing the key ring to extend out from the key retention chamber (not shown) while still attached to the key. There is preferably a spring loaded plate (not shown) made of the same proximity signal blocking material as the body 120 that covers the key chain holes (not shown) when there is not a key chain in them, but will pivot or retract into the body 120 when a key chain is in the key chain holes (not shown).

When employing a breathalyzer 130, upon arrival at a destination where alcohol and/or THC is likely to be consumed or inhaled, the key to a vehicle driven to the destination can be inserted into the key retention chamber (unnumbered) defined by the body 120 of the locking key case 110 by (i) pressing the activation button 150 on either locking key case 110 or the breathalyzer 130, and (ii) upon command from the LED display screen 160 on either the locking key case 110 or the breathalyzer 130 (e.g., "BLOW") blowing into the blow tube 131 on the breathalyzer 130. If the measured BAC and/or BCC from the blow is less than a previously established BAC and/or BCC threshold level, a visual indicator will display on either the locking key case 110 or the breathalyzer 130 (e.g., a green light 61 with or without the BAC and/or BCC detected level), and a latch (unnumbered) locking the body 120 will unlock. The body 120 can then automatically open or be manually opened (e.g., by pressing down on the latch (unnumbered)) to provide access to the key retention chamber (unnumbered) defined by the body 120. The key or key fob can then be placed inside the body 120 and the body 120 closed to once again lock the latch (unnumbered).

Access to a key locked in the key retention chamber (not shown) for use in operating the vehicle associated with the key requires the driver to again press the activation button 150, and upon command from the LED display screen 160 blow into the blow tube 131.

When employing a transdermal alcohol sensor, upon arrival at a destination where alcohol is likely to be consumed, the key to a vehicle driven to the destination can be inserted into the key retention chamber (unnumbered) defined by the body 20 by (i) pressing the activation button 150 on either the locking key case 110 or the transdermal alcohol sensor 130, and (ii) placing the sensor pad (not shown) on the transdermal alcohol sensor into contact with the skin until the LED display screen 60 indicates that a reading has been made. If the measured BAC is less than a previously established BAC threshold level, a visual indicator will display on either the locking key case 110 or the transdermal alcohol sensor (e.g., a green light 61 with or without the BAC detected level), and a latch (unnumbered) locking the body 120 will unlock. The body 120 can then automatically open or be manually opened (e.g., by pressing down on the latch (unnumbered)) to provide access to the key retention chamber (unnumbered) defined by the body 120. The key or key fob can then be placed inside the body 120 and the body 120 closed to once again lock the latch (unnumbered).

Access to a key locked in the key retention chamber (not shown) for use in operating the vehicle associated with the key requires the driver to again press the activation button 50 and place the sensor pad (not shown) into contact with the skin until the LED display screen 60 indicates that a reading has been made.

If the user's BAC and/or BCC is less than the previously selected BAC and/or BCC threshold level a positive visual indicator will display on either the locking key case 110 or the breathalyzer 130/transdermal alcohol sensor (e.g., a green light 61 with or without the BAC and/or BCC detected level), and the latch on the body 120 will release to provide access to and permit removal of the key retained therein. If, however, the user's BAC and/or BCC is greater than the preset BAC and/or BCC threshold level, a negative visual indicator will display on either the locking key case 110 or the breathalyzer 130/transdermal alcohol sensor (e.g., a red light 62 with or without the BAC and/or BCC detected level), and the latch (not shown) will remain locked, thereby preventing use of the key.

The BAC and/or BCC threshold level can be set by pressing and holding the activation button 150, or perhaps by pressing a separate Set BAC/BCC button (not shown). The LED display screen 160 can display a first selectable BAC and/or BCC level (e.g., "0.02% BAC and/or 1 ng/ml BCC respectively") with repeated pressing of the activation button 150 or Set BAC/BCC button (not shown) displaying progressively increasing BAC and/or BCC levels (e.g., 0.03% BAC, 0.04% BAC, 0.05 BAC, 0.06% BAC and finally 0.07% BAC and/or 2 ng/ml BCC, 3 ng/ml BCC, and finally 4 ng/ml BCC). It is preferred to limit the lowest selectable level at some amount over 0 to accommodate some level of sensor drift or detection of compounds other than alcohol or cannabinoid that could result in a prolonged mistaken lockout. It is also preferred to limit the highest selectable level at some amount less than the legal limit to prevent access to the key when the legal limit has been detected. Once the desired BAC and/or BCC threshold level is displayed, the level is selected as the BAC and/or BCC threshold level by pressing and holding the activation 150 or Set BAC/BCC button.

In a preferred embodiment, the BAC and/or BCC threshold level can be set or reset only while access to the locking key case 110 has been granted to eliminate the ability to access a locked key without "passing" the breathalyzer/transdermal alcohol sensor test by simply resetting the threshold level above the intended and desired level and above the level the user currently finds themselves. For example, the breathalyzer 130/transdermal alcohol sensor can be programmed to automatically present an option to set or rest the BAC and/or BCC threshold level promptly after each "passed" breathalyzer test.

Optionally, the currently selected BAC and/or BCC threshold level can be checked at any time with a double click of the activation button 150 or Set BAC/BCC button.

A protective cap (not shown) on the breathalyzer 130 embodiment can cover the blow tube 131 to keep it clean and protect it from damage. The protective cap can be secured to the breathalyzer 130 with magnets (not shown) or via a friction or snap fit. In an alternative embodiment, a slide tab 80 extends from the body 20 capable of thumb activated sliding of the blow tube 131 as between an extended use position and a retracted storage position concealed within the breathalyzer 130.

The blow tube 131 on the breathalyzer embodiment is preferably replaceable, such as via a friction fit onto the breathalyzer 130 which can be overcome by axially twisting the blow tube 131 relative to the breathalyzer 130. The blow tube 131 can be translucent and sized for accurate breathalyzer tube size requirements.

The locking key case 110 and the breathalyzer 130/transdermal alcohol sensor can each be powered by a disposable or rechargeable battery, such as a button cell battery (not shown). Alternatively, one can be powered by a battery and equipped with a charging induction coil 201 in electrical communication with the battery, while the other is equipped with a chargeable induction coil 202 able of receiving an electrical charge from the charging induction coil 201 on the battery-powered component. Each of the locking key case 110 and the breathalyzer 130/transdermal alcohol sensor preferably have an automatic power down mode when not in use to save battery life.

We claim:

1. A vehicle operation sobriety control unit functional for preventing operation of a vehicle by an intoxicated individual, comprising:
   (a) a module operable for detecting and measuring a blood intoxicant concentration level of an individual and comparing a measured blood intoxicant concentration level relative to a threshold blood intoxicant concentration level,
   (b) a housing enclosing the module,
   (c) a blow tube in fluid communication with the module for delivering breath sample from a user to the module,
   (d) a slide tab extending from the housing operable for thumb activated sliding of the blow tube as between an extended use position and a retracted storage position concealed within the housing, and
   (e) a key case (i) selectively openable and closeable to provide and prevent access to a chamber respectively, (ii) operable for confining a vehicle start key within the closed chamber such that the confined vehicle start key is unable to start a vehicle, and (iii) default locked when closed to prevent access to the chamber when the key case is closed, (f) the key case in communication with the module for opening the key case when a blood intoxicant concentration level below the threshold blood intoxicant concentration level is detected by the module, (g) wherein the sobriety control unit has a shape that imitates a commonplace object so as to conceal the functionality of the sobriety control unit.

2. The vehicle operation sobriety control unit of claim 1, wherein the module is operable for detecting and measuring a blood alcohol concentration level of an individual.

3. The vehicle operation sobriety control unit of claim 1, wherein the module is operable for detecting and measuring a blood cannabinoid concentration level of an individual.

4. The vehicle operation sobriety control unit of claim 1, wherein the threshold blood intoxicant concentration level can be set by a user of the vehicle operation sobriety control unit only after a blood intoxicant concentration level below the threshold blood intoxicant concentration level is detected by the module.

5. The vehicle operation sobriety control unit of claim 4, wherein the threshold blood intoxicant concentration level can only be selected at a blood intoxicant concentration level below a legal intoxication limit for driving the vehicle.

6. The vehicle operation sobriety control unit of claim 1, wherein the module and the key case comprise a single integrated unit.

7. The vehicle operation sobriety control unit of claim 1, wherein the module and the key case comprise two separate components equipped for wireless communication between the components, with each component having a shape that imitates a commonplace object so as to conceal the functionality of the sobriety control unit.

8. The vehicle operation sobriety control unit of claim 1, further including (i) a rechargeable battery in electrical communication with the module, and (ii) a charging induction coil for charging the rechargeable battery.

9. The vehicle operation sobriety control unit of claim 1 wherein the key case is configured and arranged for nondestructive disassembly only when the key case is in the open state.

\*  \*  \*  \*  \*